(No Model.)

T. B. JEFFERY.
WHEEL TIRE.

No. 558,956. Patented Apr. 28, 1896.

Witnesses:
Jean Elliott
Julia Usler

Inventor:
Thos. B. Jeffery
By Burton and Burton
His Attorneys.

UNITED STATES PATENT OFFICE.

THOMAS B. JEFFERY, OF CHICAGO, ILLINOIS.

WHEEL-TIRE.

SPECIFICATION forming part of Letters Patent No. 558,956, dated April 28, 1896.

Application filed April 3, 1891. Serial No. 387,493. (No model.)

*To all whom it may concern:*

Be it known that I, THOMAS B. JEFFERY, a citizen of the United States, residing at Chicago, county of Cook, and State of Illinois, have invented certain new and useful Improvements in a Wheel-Tire, which are fully set forth in the following specification, reference being had to the accompanying drawings, forming a part thereof.

This invention relates to tires having inflatable cores; and it consists in the character and construction of the inclosing sheath and the mode of securing the same to the rim.

Figure 1:
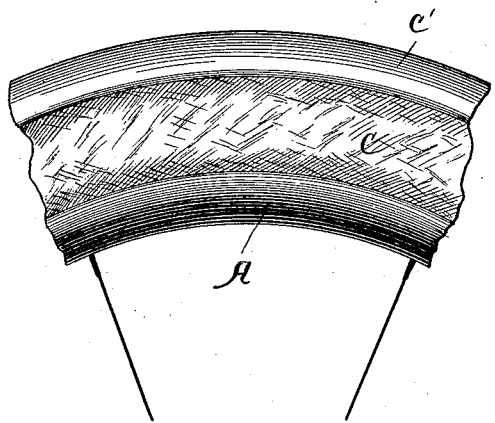
Figure 2:
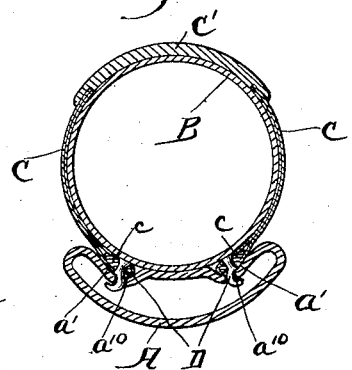
Figure 4:
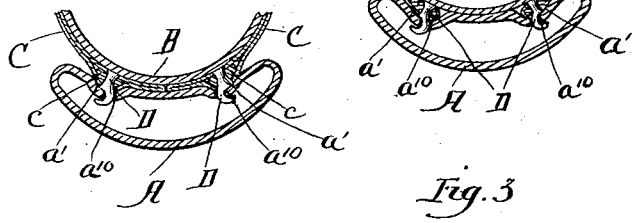
Figure 3:
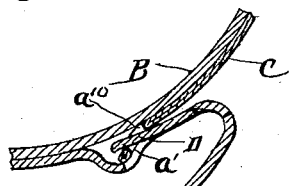

In the drawings, Figure 1 is a side elevation of a portion of the wheel-rim. Fig. 2 is a section transversely through the tire and rim shown in Fig. 1. Fig. 3 is a transverse sectional detail showing a slightly-modified form of the device for attaching the cord-inclosing sheath to the rim. Fig. 4 is a detail transverse section showing a modified form of the sheath or envelop for the core.

A is the rim; B, the inflatable core. C C are similar lateral portions, made of canvas or similar fabric, of the sheath which incloses the core. C' is the remaining middle portion of the sheath, constituting the tread. The sheath is completed by the portion of the rim which forms the seat for the tire.

The rim is a hollow rim made in a familiar manner from tubing rolled into the shape transversely which is shown in Fig. 2, having the outer side transversely concave to form a seat for the tire. For the purpose of adapting it to receive my improved tire the rim is preferably formed with the peripheral channels $a'$ $a'$ in the outer or concave wall; but these are not essential to my invention, considered in its broadest phase. Their use, when present, will appear from the further description.

The lateral portions C C of the sheath, preferably made, as stated, of canvas or other web, may be made by folding the canvas strip in the middle, bringing the two edges together, the fold being filled with the cord C for the purpose of giving it greater body to receive and afford fastening for the hooks and buttons hereinafter described. This cord is not essential, but only a preferred construction.

The lateral pieces are joined at the edges remote from the fold to the tread portion C', which is of rubber or other substance suitable for the tread, having sufficient thickness to endure the wear and sufficient elastic flexibility to adapt it to yield with the core, and having also tensile elasticity, so that the sheath which comprises it as the middle section is transversely extensible to a slight degree. The advantage of such extensibility in the sheath is that when the core is made of non-extensible material, but is merely inflatable without elasticity, the transverse tensile elasticity of the sheath due to the tread portion will cause the core and sheath to come into as complete contact throughout as would be the case if the core were extensible, for in that case the core will be made of such transverse size that when fully inflated a slight extension of the sheath will be necessary to accommodate it.

To the unattached edges of the lateral portion C of the sheath I secure the hooks or buttons D D, sufficiently near together throughout the periphery of the tire to prevent the said folded edges from buckling out from between the core and rim. The rim is pierced with the eyelet-holes or buttonholes $a^{10}$ at intervals corresponding to the distances between the buttons or hooks D, said eyelet-holes or buttonholes being formed in the channels $a'$ when the rim is made with such channels. One of said pieces C being hooked or buttoned into the rim by the engagement of the hooks or buttons D in the apertures $a^{10}$ at one side the inflatable core is placed in position but not inflated, and the unattached edge of the opposite lateral piece C is similarly buttoned or hooked into the apertures in the channel $a$ at the other side. When the core is now inflated, its tension being exerted in all directions tends to draw the hooks securely into their respective holes in the rim and effectually prevents dislodgment.

The security of the attachment of the sheath to the rim is further increased by the employment of the cord $c$ between the folds of the canvas, making beads or thickened ridges for the lateral piece $c$, which are seated in the channels $a'$ $a'$ and are forced and held firmly therein by the tension of the inflated core.

An obvious modification of this construction is illustrated in Fig. 3, wherein the hooks or detaining projections are formed on the rim and the eyelets to receive them are formed in the lateral portions of the sheath. I have applied the same letters of reference, however, to the projections, whether they are on the tire or on the sheath, and have also applied the same letters to the eyelets or buttonholes, whether they are on the one piece or on the other.

It is not a necessity that the lateral pieces C terminate at their lines of reinforcement or attachment to the rim, and, on the contrary, one or both of them might be extended farther under the inflatable core, so as to rest between said core and the rim and form a lining for the seat of the core in the rim; and such extension adapts the sheath to be held more firmly in its place by the inflation of the core, and such inflation, holding the inwardly-extended edges of the sheath firmly seated between the core and the rim, keeps the beads formed by the cord c in the grooves or channels a' of the rim and makes them assist materially in holding the sheath from spreading when the core is inflated.

In Fig. 4 I have illustrated a construction in which the canvas pieces C extend under the core between it and the rim. It is important that, whether or not the inelastic side pieces C extend entirely around the inflatable core at the inner side, they should not extend entirely around it at the outer side, but leave a considerable distance to be spanned by the elastic tread c', by which transverse tensile elasticity is given the sheath, as above explained. This construction affords opportunity for detaching one edge of the envelop or sheath which retains the core from the rim at the whole or any portion of the periphery, in order either to remove the core or give access to any particular point or part of the core, and to reattach the sheath readily after the necessary repairs have been made to the core.

The use of the buttons or hooks, in lieu of any continuous fastening, affords the advantage of detachability for short distances without detaching the entire edge or even any large section of the edge, and, as compared with familiar devices, such as continuous lacing, it affords a similar advantage that the fastening need not even be relaxed or slackened anywhere except at the point where it is desired to completely detach in order to get full access to the core.

Broadly considered, it will be manifest that the portion of the metal rim between the two peripheral lines of fastening of the lateral portions C of the sheath forms a part of the core-sheath independently of the fact that it is a part of the rim.

I do not limit myself strictly to making the side pieces by folding the canvas, since this is only a preferred means of producing a reinforcible edge, and since it is not necessary that the rift which is left between the side pieces for inserting the core should be complete or continuous, because the core can be inserted at a rifted part and drawn around. The advantage, however, of accessibility to the core at all points without moving the core makes the structure shown specifically preferable.

I claim—

1. The rim and an inflatable tire-core combined with a sheath or envelop for the core having its lateral portions formed of fabric which is not elastically extensible and having the middle portion including the tread formed of elastically-extensible substance such as rubber: substantially as set forth.

2. The rim and an inflatable core combined with an envelop or sheath for the core parted under the core and fastened to the rim at two peripheral lines, one on each side of the plane of parting, and detachable from the rim at one of the said lines of fastening; said sheath having its lateral portions flexible, but not laterally extensible, and its middle portion, including the tread, elastically extensible: substantially as set forth.

3. The rim and the inflatable core combined with an envelop or sheath for the core, said sheath having its lateral portions formed of canvas or other non-extensible fabric folded upon itself to form the lateral edges of the sheath, and having a cord or filling inserted in such fold to enlarge and reinforce the same: substantially as set forth.

4. In combination with the inflatable core, the sheath which incloses it rifted at the inner side to admit the core and thickened at suitable lines on opposite sides of the rift, and apertured to receive fastenings at such thickened lines: substantially as set forth.

5. The rim and an inflatable core combined with an envelop comprising a tread of cushioning substance and lateral portions composed of textile fabric which are joined to the rim at two peripheral lines, and extend inwardly from said lines underneath the core between the same and the rim in the plane of the pressure radial with respect to the wheel, which is experienced by the tread and exerted by the inflation of the core; whereby the tension of the air in the core due to inflation and to the pressure of the load operates on said inwardly-extending fabric portions of the sheath to hold them seated in the rim: substantially as set forth.

6. The rim and the core adapted to be seated therein and the envelop or sheath for the core joined to the rim at two peripheral lines under the core, said sheath being corded or filled to form beads at the lines of fastening to the rim, and the rim having peripheral channels in which said beads of the sheath are seated: substantially as set forth.

7. In combination with the inflatable core, the envelop or sheath for the same having a tread portion which is elastically extensible circumferentially with respect to the wheel, and lateral portions which are substantially inelastic or less elastic and extensible than the said tread portions: substantially as set forth.

8. In combination with the inflatable core, the envelop or sheath having a tread portion of rubber and side portions of canvas or similar fabric substantially non-extensible circumferentially with respect to the wheel, such circumferentially-inextensible fabric being joined to the tread portion at the side edges and intermitted within the tread: substantially as set forth.

9. The rim and the inflatable core combined with an envelop or sheath for the core, said sheath having its lateral portions formed of canvas or other non-extensible fabric folded upon itself, and its middle portion formed of rubber or like substance permanently joined at its lateral edges to the double edges of the folded lateral portions respectively, the fold of said lateral portions being filled or corded and detachably joined to the rim: substantially as set forth.

10. In combination with the rim having peripheral grooves in the tire-seat, the inflatable core and envelop for the same rifted at the inner side to admit the core and permit its removal, and comprising a tread of cushioning substance, and lateral portions which are provided respectively with beads adapted to engage the grooves of the rim, and extending inward from said beads to the rift; whereby the inflation of the core presses such inwardly-extending marginal portions of the sheath against the rim between the planes of the beads: substantially as set forth.

11. An envelop for an inflatable tire-core consisting of a metallic base which forms the seat for the core; a tread of cushioning substance opposite the base, and lateral portions of inelastic fabric permanently joined to the lateral edges of the tread portion respectively and detachably joined to the metallic base: substantially as set forth.

In testimony whereof I have hereunto set my hand, at Chicago, Illinois, in the presence of two witnesses, this 30th day of March, 1891.

THOS. B. JEFFERY.

Witnesses:
   CHAS. S. BURTON,
   JEAN ELLIOTT.